United States Patent

[11] 3,556,269

| [72] | Inventor | Lars-Olof Knutson Norlin |
| | | Vallvagen 12, Lidingo, Sweden |
| [21] | Appl. No. | 738,946 |
| [22] | Filed | June 21, 1968 |
| [45] | Patented | Jan. 19, 1971 |

[54] COMBINED SPRING AND DAMPING DEVICE
2 Claims, 4 Drawing Figs.

| [52] | U.S. Cl. | 188/281, 188/100 |
| [51] | Int. Cl. | F16f 9/346 |
| [50] | Field of Search | 188/87, 87A, 94, 100P, 97.1; 267/(Inquired) |

[56] References Cited
UNITED STATES PATENTS

| 443,152 | 12/1890 | Starr | 188/94X |
| 1,508,391 | 9/1924 | Greenwood | 188/94 |

FOREIGN PATENTS

| 753,490 | 7/1956 | Great Britain | 188/100(P) |
| 769,319 | 3/1957 | Great Britain | 188/100(P) |

*Primary Examiner*—George E. A. Halvosa
*Attorney*—Young and Thompson

ABSTRACT: A combined spring and damping device, especially intended to prevent material or persons being damaged or injured as a consequence of jolts when sudden changes in the positions of foundations take place, comprise a piston movable in a cylinder and a liquid and a gas contained in a closed chamber communicating with the cylinder space through one or several openings. The cylinder is provided with at least two check valves having opposite directions of flow. The check valves have their openings in the cylinder casing and have a total area of flow which is substantially as great as or larger than the permanent opening or openings and also substantially as great as or larger than the cross-sectional area of the cylinder.

PATENTED JAN 19 1971  3,556,269

INVENTOR.
LARS-OLOF KNUTSON NORLIN
BY Young & Thompson
ATTYS.

COMBINED SPRING AND DAMPING DEVICE

It is known to make spring and damping devices comprising a piston, sliding in a cylinder, and a closed chamber containing a liquid and a gas, which chamber communicates with the cylinder, also containing a liquid, through one or several perforations of constant flow area. It is also known to incorporate a check valve in the end wall of the cylinder housing for example in buffers of said construction. The present invention relates to a spring and damping device, the cylinder of which is provided with at least one check valve with the direction of flow from the cylinder to the chamber and at least one check valve with the opposite direction of flow, the flow areas of the check valve and the hole being dimensioned in a special relationship to each other, so that the device has a resilient as well as a damping action. The device is especially intended for use as damping means to prevent material or persons placed thereon from being damaged or injured as a consequence of jolts of the kind occuring when sudden changes in the position of the foundation take place, by way of example as a consequence of an explosion.

The movement normally performed by a spring subjected mass, when the equilibrium is disturbed, is a sine-type oscillation. From various points of view such an oscillatory movement is undesirable and therefore, an oscillation or shock absorbing device is usually coupled in parallel with the spring. Such a damping device is as a rule made in the form of a cylinder filled with a viscous liquid or gas. In the cylinder a piston provided with a number of holes or channels, the diameter of which can be large or small, is sliding, and when the piston actuated by the force of spring and mass is moving relative to the cylinder, the gas or the liquid is caused to pass through said holes or channels. On account of the viscosity a resistance against the movement is created which has a dampening effect on the oscillatory movement. In case a very sudden change in the position of the foundation takes place, then, because of the small flow area of said holes or channels relative to the area of the piston, a great resistance against the movement is created in the damping device, which latter either is destroyed or exposes the object of protection to unacceptable forces. If, on the other side, the holes or channels of the piston are too generously dimensioned, the result will be a total failure of the dampening effect.

It is an object of the present invention to eliminate the drawbacks mentioned. The essential feature of the invention is that the check valves have their openings in the cylinder wall and that the check valve or valves of each type have a total flow area which is at least as great as that of the permanent opening or openings, and also at least as great as the cross-sectional area of the cylinder. By adjusting in a suitable manner the flow areas in relation to each other, one can obtain a functioning of the device to the effect that when moderate changes take place in the mass supported by the device, the piston only slowly occupies a new position of equilibrium in the cylinder due to the viscous flow of the liquid contained in the device through the permanently open apertures. However, if a sudden change in the position of the foundation takes place, the mass supported by the piston will be subjected to a larger force due to the acceleration, resulting in the check valve or valves opening up to let through the flow of liquid from the cylinder to the chamber producing a levelling out of the forces. Thereby the device only functions as a simple spring without any dampening effect. When the force of the mass acting upon the piston has ceased to operate, the check valve is closed, whereafter the piston with damped movement can return to its original position of equilibrium.

By way of example, an embodiment of the invention will be described below with reference to the accompanying drawings, in which.

The device substantially comprises a piston $a$ in cylinder $f$ which is housed in a pressure vessel $b$ being fixed in screwed mounting into a threaded hole in head $g$, which is fastened by bolts to the pressure vessel covering an opening of the same. The cylinder is closed at its bottom end and the latter abuts against the end wall opposite the head, for example against the bottom of the chamber of pressure vessel $b$. In the cylinder casing there are two check valves, in one of which $j$, the direction of flow is from the cylinder to the pressure chamber, the direction of flow in the other one, valve $l$, being the reverse. Check valves $j$ are kept in tight fit to the cylinder casing around the valve orifices by means of tension spring $k$, while valves $l$ in corresponding manner are kept in tight fit to the inside of the cylinder casing by means of pressure spring $n$.

Figure 1:
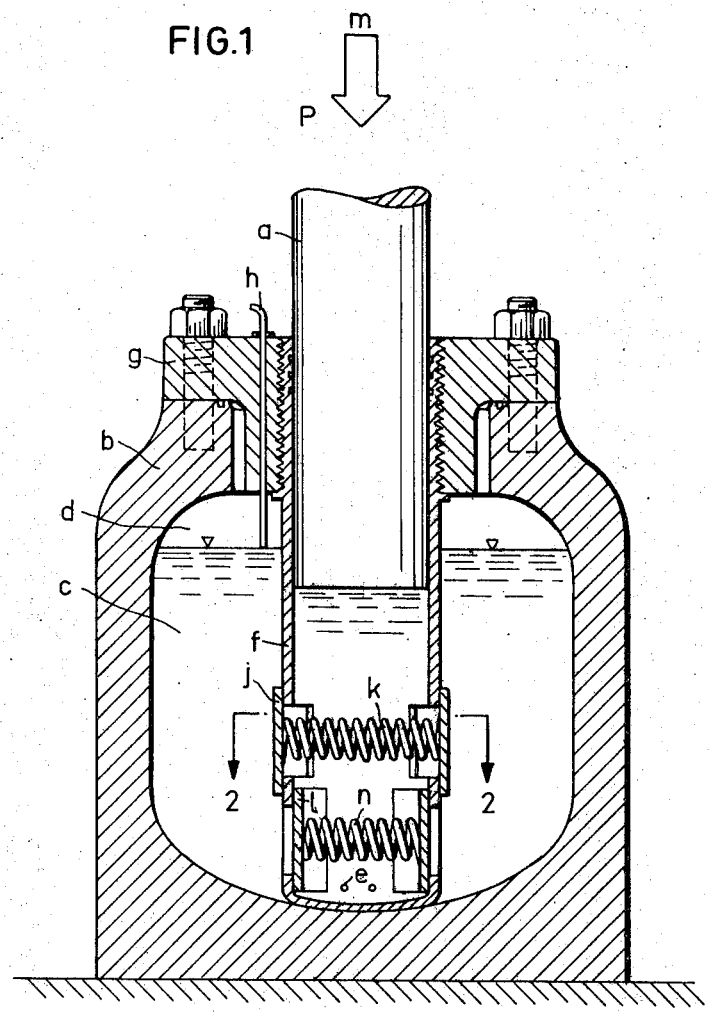
FIG. 1 shows a schematic view of an axial section of the device.
Figure 2:
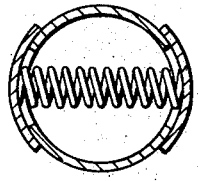
FIG. 2 shows a cross-sectional view of the cylinder along the line 2–2 in FIG. 1.
Figure 3:
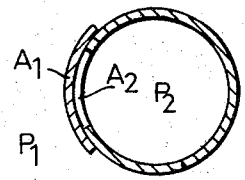
FIGS. 3 and 4 illustrate cross sections of a modified version.
Figure 4:
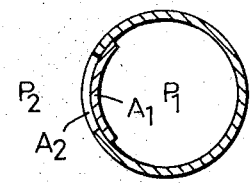

The object to be protected, having the mass $m$ can be imagined to be placed in suitable manner on piston $a$ exercising a pressure on the same corresponding to its weight P. The liquid $c$ in pressure vessel $b$ is thereby put under pressure and the same occurs with gas $d$ above the surface of the liquid. The liquid can pass through small holes $e$ in the lower portion of cylinder $f$, in which piston $a$ is movable up and down. A narrow channelled tube $h$ passes through a bore in the head $g$ of pressure vessel $b$, and through said tube liquid or gas can be fed to, or be drawn off, the pressure vessel. In the position illustrated in FIG. 1 the pressure $p$ at the underside of the piston is assumed to be equal to the pressure P on mass $m$ and the dead weight of the piston $a$. Piston $a$ can be considered to be sealed relative to the wall of cylinder $f$ in suitable manner, so that the liquid $c$ is kept from leaking to the surrounding atmosphere because of the over pressure inside the device.

During moderate changes of mass $m$, piston $a$ because of the viscous flow of the liquid through holes $e$ only slowly seeks a new position of equilibrium relative to pressure vessel $b$. However, should a sudden rise of the foundation take place, mass $m$, because of the occuring acceleration, will exercise a considerably stronger force than P upon piston $a$, resulting in a pressure increase, which brings about a rise of the pressure in the cylinder $f$ to a value $p_2$ relative to the surrounding liquid having the pressure $p_1$. The liquid contained in cylinder $f$ thereupon actuates valves $j$ with area $A_1$ from within with a force $= p_2 x$ the valve orifice ($A_2$).

If $p_2 \times A_2 > p_1 \times A_1$, valves $j$ open up and the liquid can be squeezed from cylinder $f$ out in pressure vessel $b$ opposing very little resistance to piston $a$. Because of the location of the valves in the cylinder they can be given area dimensions, which are at least as great as the area of piston $a$. By adjustment of the relation $A_1 : A_2$ the acceleration of mass $m$ can be given a desired value.

As soon as the valves are opened, a levelling out of the forces is obtained via said valves, whereby a very moderate pressure difference is required to keep them open against the comparatively feeble force exercised by spring $k$. The device thereby functions only as a simple spring without any damping action. When the force of mass $m$ on piston $a$ has ceased to operate, i.e. when the foundation again is at a standstill, the orifices are closed by spring $k$, and piston $a$ thereafter with a damped movement slides back to its original position of equilibrium, when compressed gas $d$ under expansion again occupies its original volume forcing liquid $c$ to flow back into cylinder $f$ through holes $e$.

On the other hand, if the change in position takes place by a sudden caving in of the foundation, valves $l$ start functioning as per above, but with the forces operating in opposite direction. When the pressure difference is equalized, valves $l$ again are closed by spring $n$.

Irrespective of the fact that piston $a$ should be in the position of static equilibrium, when the movements of the foundations occur in one or the other direction, the valve system as well as the spring damping system function to the effect that periodic oscillations are avoided and the mass forces are reduced to permissible values.

The construction shown on the drawing is a schematic illustration. Without any important differences the device can be made to function with the piston movement taking place in a horizontal direction. Further, by means of suitable hinge and linkage arrangements, the device may be made to take care of two and three dimensional movements of the foundation in addition to the one dimensional movement described above.

There is no limit to the length of the piston stroke, neither is there any limitation as to the relation between the areas of the valve orifices and the piston area.

The shock absorbing device without resorting to any exceptional engineering technique can be adapted to take care of even very heavy loads.

I claim:

1. A combined resilient and dampening device with a piston movable in a cylinder and a liquid and a gas contained in a closed chamber communicating with the cylinder space containing liquid through at least one opening with constant flow area, the cylinder having at least one check valve having the direction of flow from the cylinder to the chamber and at least one check valve with the opposite direction of flow, the check valves having their openings in the wall of the cylinder casing and the check valve of each type having a total area of flow at least as great as the area of flow of said at least one opening, said total area of flow also being at least as great as the cross-sectional area of the cylinder, each one of the check valves being provided with a valve body having a larger area than the area of the flow orifice of the valve and said valve bodies being engaged with the cylinder casing around the orifices with a force only sufficient to keep a fluid-tight fit to the cylinder, so that said valves can be kept closed or be opened, respectively, substantially on account of difference in pressure within and outside the cylinder.

2. A device as claimed in claim 1, wherein the acceleration of the mass to be dampened is determined by the relation between the area of the valve body and the area of the valve orifice.